(12) United States Patent
Seger et al.

(10) Patent No.: US 8,613,354 B2
(45) Date of Patent: Dec. 24, 2013

(54) GUIDE RAIL FOR AN APPARATUS FOR TRANSPORTING PET-BOTTLES AND APPARATUS FOR TRANSPORTING PET-BOTTLES

(75) Inventors: Martin Seger, Neumarkt i. d. Opf. (DE); Johann Huettner, Mallersdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 153 days.

(21) Appl. No.: 13/108,954

(22) Filed: May 16, 2011

(65) Prior Publication Data

US 2012/0000746 A1    Jan. 5, 2012

(30) Foreign Application Priority Data

Jul. 5, 2010  (DE) .......................... 10 2010 017 724
May 11, 2011  (EP) ..................................... 11165605

(51) Int. Cl.
*B65G 21/20*    (2006.01)
(52) U.S. Cl.
CPC ...................................... *B65G 21/20* (2013.01)
USPC ....................................... 198/836.1; 198/500
(58) Field of Classification Search
USPC .......................................... 198/836.1–836.4
See application file for complete search history.

(56) References Cited

U.S. PATENT DOCUMENTS

| | | | |
|---|---|---|---|
| 3,491,873 A | 1/1970 | Fauth | |
| 3,788,457 A * | 1/1974 | Valentino, Jr. ............. | 198/836.1 |
| 4,502,594 A * | 3/1985 | Sijbrandij .................. | 198/836.3 |
| 4,958,725 A * | 9/1990 | Meade et al. .............. | 198/836.1 |
| 5,366,061 A * | 11/1994 | Kruse et al. .................... | 198/335 |
| 5,533,826 A * | 7/1996 | Cairns .......................... | 403/389 |
| 5,601,180 A * | 2/1997 | Steeber et al. ............. | 198/502.1 |
| 5,896,980 A * | 4/1999 | Butler ........................ | 198/836.1 |
| 6,068,112 A * | 5/2000 | Kasai et al. .................... | 198/853 |
| 6,105,757 A * | 8/2000 | Ledingham ................ | 198/836.3 |
| 6,591,970 B2 | 7/2003 | Olson | |
| 7,150,351 B2 * | 12/2006 | Wiejack-Symann ......... | 198/730 |
| 2003/0168319 A1* | 9/2003 | Hart et al. ................ | 198/781.04 |
| 2011/0067973 A1* | 3/2011 | Matheisl et al. .............. | 198/337 |

FOREIGN PATENT DOCUMENTS

| | | |
|---|---|---|
| DE | 7426991 U | 11/1974 |
| DE | 2439804 A1 | 3/1976 |
| DE | 7631052 U1 | 1/1977 |
| DE | 3116334 A1 | 11/1982 |
| DE | 29610201 U1 | 1/1997 |
| DE | 10023151 A1 | 11/2001 |
| DE | 10118565 A1 | 10/2002 |
| DE | 102006049488 A1 | 4/2008 |
| DE | 102007052733 A1 | 5/2009 |

(Continued)

OTHER PUBLICATIONS

Search Report from German Patent Application DE11165605.4 filed May 11, 2011, mailed Dec. 1, 2011.

*Primary Examiner* — Mark A Deuble
(74) *Attorney, Agent, or Firm* — Patentbar International, P.C.

(57) ABSTRACT

A guide rail (1) for an apparatus for transporting PET-bottles (12) is disclosed. The guide rail (1) supports a guiding insert (3), which is touched by the PET-bottles (12) during transport. The surface (5) of the guiding insert (3) touching the PET-bottles (12) is provided with a polymer material (P) which at 23° C. has a larger modulus of elasticity than PET and at 100° C. itself has a modulus of elasticity lower by less than 20%.

27 Claims, 7 Drawing Sheets

(56) References Cited

FOREIGN PATENT DOCUMENTS

| | | | |
|---|---|---|---|
| EP | 0017637 | A1 | 10/1980 |
| EP | 0891933 | A1 | 1/1999 |
| EP | 1198524 | B1 | 4/2002 |
| JP | 6227632 | A | 8/1994 |
| JP | 2005289610 | A1 | 4/2007 |

* cited by examiner

GUIDE RAIL FOR AN APPARATUS FOR TRANSPORTING PET-BOTTLES AND APPARATUS FOR TRANSPORTING PET-BOTTLES

CROSS REFERENCE TO RELATED APPLICATIONS

This patent application claims priority of German Patent Application No. 10 2010 017 724.5, filed on Jul. 5, 2010 and the European Patent Application No. 11165605.4, filed on May 11, 2011, both applications are incorporated herein by reference.

FIELD OF THE INVENTION

The present invention relates to a guide rail for an apparatus for transporting PET-bottles.

Additionally, invention relates to a guide rail for an apparatus for transporting PET-bottles.

BACKGROUND OF THE INVENTION

Apparatuses for transporting containers made of a plastic material, for example polyethylene terephthalate (PET), are known in the art. The apparatuses use guide rails to guide and secure the containers or bottles along the transport path, so that a safe transport of the articles is assured. In case of single-lane transport of the containers it is advisable that a guide rail be provided on either side of the transport path. In case of a multi-lane transport path it is sufficient to provide a guide rail on the outer sides of the transport path.

The Japanese patent application JP 2005289610 A2 discloses a guiding rail consisting of a material having a better resistance to abrasion, a better resistance to shock, and a better sliding property than conventional materials for guiding rails. The material of the guiding rail consists of a polyethylene (PE), wherein the polymer chains have a very high molecular weight (PE-UHMW). The wear of the guiding rail can easily be determined by providing a coloured marker at the bottom of a groove or notch. If the coloured marker has been worn off, the guiding rail needs to be replaced.

From U.S. Pat. No. 3,491,873 guiding rails or guide rails for an apparatus for transporting containers are known. The guiding rail consists of a stiff support material, which is suitably configured for receiving an insert of plastic. The support material consists of aluminium. The plastic insert wearing off during use can be easily replaced. It is not necessary to replace the entire guide rail. The plastic insert is attached to the stiff support material in a form locking and/or force locking manner.

The European patent EP 0 891 933 B1 discloses a guiding rail exhibiting a metallic channel element formed by lateral walls. Between the lateral walls a plastic insert is accommodated.

The German patent application DE 10 2006 049 488 A1 discloses an apparatus for processing flat, fragile substrates. The substrates are acted upon by a processing fluid in a processing chamber. For this purpose they are transported through the processing chamber in a horizontal way by a transport apparatus. Lateral guiding systems, exhibiting cylindrical, pivotable lateral guiding rollers, assure an advantageous transport of the substrates directed in a direction of transport. A suitable material for the lateral guiding rollers is polytetrafluorethylene (PTFE) or polyether ether ketone (PEEK).

The German patent application DE 100 23 151 A1 discloses an arrangement of transport belts for the transport and/or flip-over of laminar material. The transport surfaces of the belts are conducted via rotating, disc-shaped or cylindrical redirecting elements, wherein the redirecting elements are provided with a recess guiding the belt. The recess is bounded by areas containing or consisting of friction-reducing materials. The friction-reducing materials are PTFE of PEEK.

The Japanese patent application JP 06227632 describes a transport chain, wherein the inner diameter of the rollers consists of a PEEK.

SUMMARY OF THE INVENTION

It is an object of the invention to provide a simple and cost-effective guide rail for transporting containers or PET-bottles, which assures an essentially invariant transport of the containers. Additionally, with the guide rail according to the invention, the friction conditions remain essentially unchanged during service life.

The above object is achieved by a guide rail for an apparatus for transporting PET-bottles comprises:
   a guiding insert supported by said guide rail, such that a surface of the guiding insert which faces the PET-bottles is in contact with the PET-bottles during transport; and
   a polymer material is provided to the least surface of the guiding insert which is in contact with the PET-bottles, wherein the polymer material has at 23° C. has a larger modulus of elasticity than PET and at 100° C. itself has a modulus of elasticity reduced by less than 20%.

It is a further object of the invention to provide an apparatus for transporting containers or PET-bottles, which assures an essentially invariant transport of the containers and avoids any congestion or down time of the apparatus.

The above object is achieved by an apparatus for transporting PET-bottles or containers, comprises:
   a conveyor belt;
   at least one guide rail defines a transport lane on the conveyor belt;
   a guiding insert supported by said guide rail, such that a surface of the guiding insert which faces the PET-bottles is in contact with the PET-bottles during transport; and
   a polymer material is provided to the least surface of the guiding insert which is in contact with the PET-bottles, wherein the polymer material has at 23° C. has a larger modulus of elasticity than PET and at 100° C. itself has a modulus of elasticity reduced by less than 20%.

Recent tests have shown that the contact between the containers or PET-bottles to be transported and the guide rail leads to an increased friction between the containers to be transported and the guide rail. It is surmised that polymer chains are freed out of the outer surface of the PET-bottles and adhere to the guide rail, which essentially consists of PE-boards. This process corresponds to the adhesion of the PET-chains to the PE-material of the guide rail.

It has been realised that the guide rail for an apparatus for transporting PET-bottles has to be provided with a guiding insert. The guiding insert therein is configured in such a way that exclusively a surface of the guiding insert facing the PET-bottles is in contact with the PET-bottles during transport. Therein at least the surface of the guiding insert being in contact with the PET-bottles is provided with a polymer material, which at 23° C. has a larger modulus of elasticity than PET, and at 100° C. itself has a modulus of elasticity lower by less than 20%.

According to an embodiment the surface of the guiding insert being in contact with the PET-bottles is a coating consisting of this polymer material. Furthermore it is conceivable that the material of the entire guiding insert consists of such a polymer material.

The guiding insert preferentially is attached to the guide rail in a form-locking and/or force-locking manner, wherein also plural guiding inserts may be attached to the guide rail one above another. The number of guiding inserts attached to the guide rail in principle is determined by the shape of the containers to be transported. The guide rail itself may be mounted on an additional support element for further stabilisation. The support element is usually made from a metal.

The guide rail itself consists of polyvinyl chloride (PVC), polyethylene (PE), polyethylene with high molecular weight (PE-UHMW), or polyethylene with high density (PE-HD). The polymer material of the guiding insert or of the coating on the guiding insert may be PEEK, polyphenylene ether (PPE), or polyetherimide (PEI). For some applications it is conceivable for the support element to take over the functions of the guide rail and for the guiding insert to be attached directly to the support element.

For increasing mechanical stability the polymer material can be provided with a filler material Filling of the polymer material is advisable, if the entire guiding insert is made of the material which also comes into contact with the outer surface of the containers to be transported. As a filler material for example glass fibres may be used. Furthermore spheres of glass or ceramic are preferred, which increase the mechanical stability and reduce the friction between the PET-bottles and the guide rails.

A further advantage of the glass or ceramic spheres is that, due to the uneven surface of contact with the PET-bottles, the friction can be significantly reduced. In this way it is also conceivable for conventional support materials like for example polyamide (PA), polyoxymethylene (POM), polyvinyl chloride (PVC), polyethylene (PE), polyethylene with high molecular weight (PE-UHMW), or polyethylene with high density (PE-HD), provided with rounded or spherical elements, like for example glass or ceramic spheres, to cooperate as uniform guide rail with the PET-bottles. The added elements therein increase the surface roughness to a level which is higher than the roughness of the basic material and/or the carrier material (actually of the guiding rail or the guiding insert). The mean diameter of the elements therein is in the millimeter range, preferentially less than one millimeter, and particularly preferentially even less than half a millimeter.

On the same principle of a reduced surface of contact a guide rail or guiding insert with a treated surface is based, exhibiting a structure with elevations and/or depressions. To this end the surface of contact may be provided with notches, preferentially grooves or particularly preferentially a further type of profile similar to a grained or wavy contour, which as a whole forms an essentially uniformly cooperating surface of contact in the contact range, without the PET-bottles being partially deformed and thus partially entering the depressions, increasing the points of contact in this way. The intended unevennesses therein again increase the surface roughness to a level higher than the roughness of the basic material and/or of the support material (actually of the guiding rail). The difference between the elevations and depressions therein is in the millimeter range, preferentially smaller than two millimeters and particularly preferentially even below one millimeter.

BRIEF DESCRIPTION OF THE DRAWINGS

Below embodiments shall illustrate the invention and its advantages with reference to the accompanying figures. The size ratios of the individual elements with respect to each other in the figures do not always correspond to the real size ratios, as some shapes are shown in a simplified way and other shapes are shown enlarged with respect to other elements for better illustration.

FIG. 10b shows a cross section of the embodiment of the guide rail according to FIG. 10a.

FIG. 11b shows a cross section of the embodiment of the guide rail according to FIG. 11a.

DETAILED DESCRIPTION OF THE INVENTION

Identical reference numerals are used for like elements of the invention or elements of like function. Furthermore only those reference numerals are shown in the individual figures, which are necessary for the description of the respective figure. The embodiments shown are only examples of how the device and apparatus according to the invention and the method according to the invention may be realised, and do not constitute a final limitation.

Figure 1:
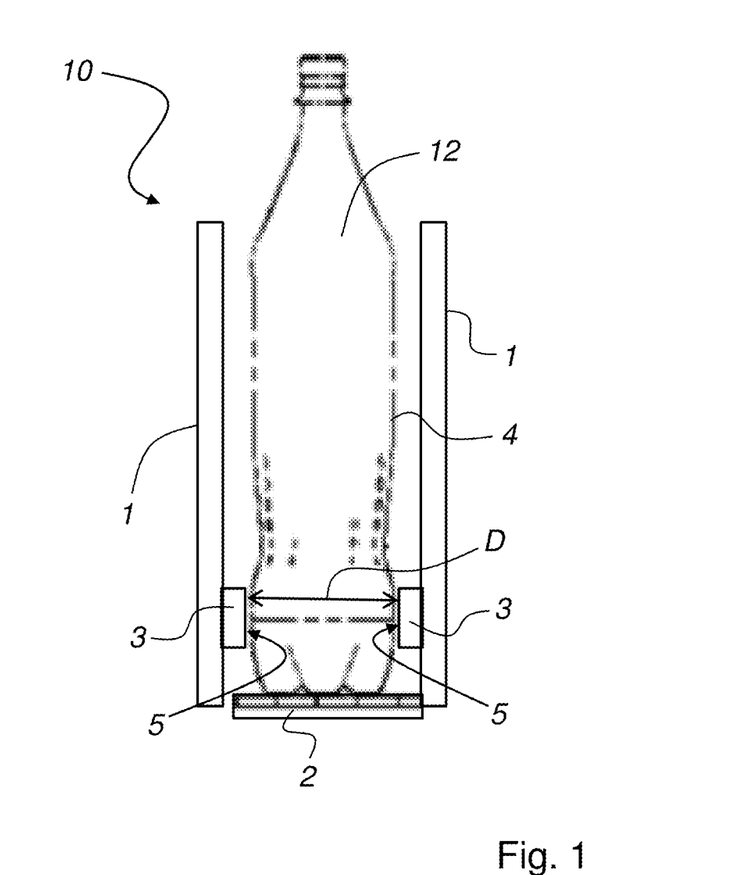
FIG. 1 shows a schematic view of an embodiment of the apparatus for the transport of containers with an embodiment of the guide rail according to the invention, wherein the direction of transport is directed into or out of the plane of the drawing.

FIG. 1 shows a schematic representation of an apparatus 10 for transporting PET-bottles 12. In the representation of FIG. 1 the PET-bottles 12 are transported in a single lane on, usually abutting one another. In the case of single-lane transport it is advisable that a guide rail 1 be provided on either side of the conveyor belt 2. The arrangement of the two guide rails 1 at the sides of the conveyor belt 2 thus forms a lane, in which the PET-bottles 12 are transported. Each of the guide rails 1 supports a guiding insert 3, which is arranged in such a way on the guide rail 1 that a surface 5 of the guiding insert 3 facing the PET-bottles 12 is in contact with the PET-bottles 12 during transport. It is obvious to a person skilled in the art that the invention is not limited to the single-lane transport of PET-bottles 12. For using the guide rail 1 according to the invention it is sufficient to provide the guide rail 1 on one side of the conveyor belt 2 only. This in particular is the case for changes of the direction of transport of the PET-bottles 12. In particular in the case of changes of direction the PET-bottles 12 are pushed to one side, the outer side of the curve of the conveyor belt 2. The guide rail 1 prevents the PET-bottles 12 from falling off the conveyor belt 2. Also in particular in the case of changes of the direction of transport of the bottles the pressure and the action of force on the guide rail 1 are increased. In order to also minimise the friction of the PET-bottles 12 on the guide rail 1, a guiding insert 3 is provided on the guide rail 1, so that the PET-bottles 12 to be transported make contact with the guiding insert 3 only with part of their side surfaces 4. It is advisable to provide the guiding insert in the region of the maximum effective diameter D of the PET-bottles 12.

Figure 2:
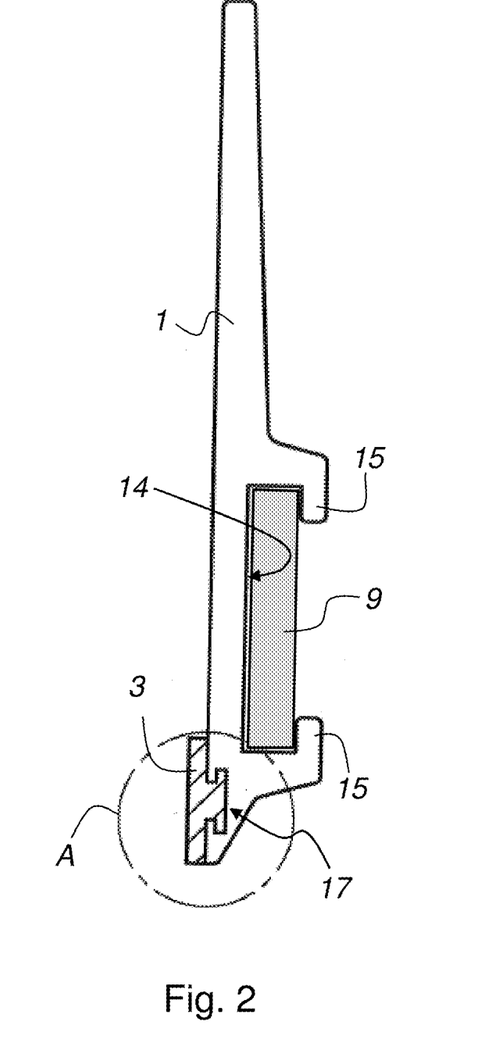
FIG. 2 shows a side view of a further embodiment of the guide rail according to the invention.

FIG. 2 shows a side surface of a possible embodiment of the guide rail 1 according to the invention. The guiding insert 3 in this embodiment is attached to the guide rail 1 in a form-locking and force-locking manner. The basic material of the guide rail 1 is polyethylene (PE). Due to the contact between the PET-bottles 12 and the basic material of the guide rail 1 there arise effects which increase the coefficient of friction between the PET-bottles 12 and the guide rail 1. According to the invention this problem is solved in such a way that at least the surface 5 of the guiding insert 3 touching the PET-bottles 12 consists of a polymer material P, which at 23° C. has a larger modulus of elasticity than PET and at 100° C. itself has a modulus of elasticity lower by less than 20%. The guide rail 1 exhibits a receptacle 14 for a support element 9. The receptacle 14 exhibits two opposite hooks 15 formed form the material of the guide rail 1, which fix the guide rail 1 to the support element 9. The support element 9 serves for the mechanical stabilisation of the guide rail 1.

Figure 3:
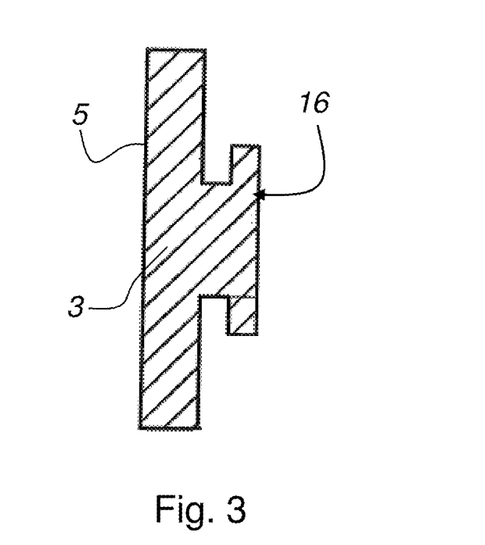
FIG. 3 shows an enlarged representation of the region indicated with an A in FIG. 2.

FIG. 3 shows an enlarged representation of the region around the guiding insert 3 indicated with an A in FIG. 2. As already mentioned in the description of FIG. 2, the entire guiding insert 3 consists of one material, like for example PEEK, PPE, or PEI. The guiding insert 3 is extruded as a profile and exhibits a mounting structure 16, which cooperates with a corresponding negative shape 17 of the guide rail 1 for attachment. The surface 5 of the guiding insert 3 cooperates with the PET-bottles 12 to be transported.

Figure 4:
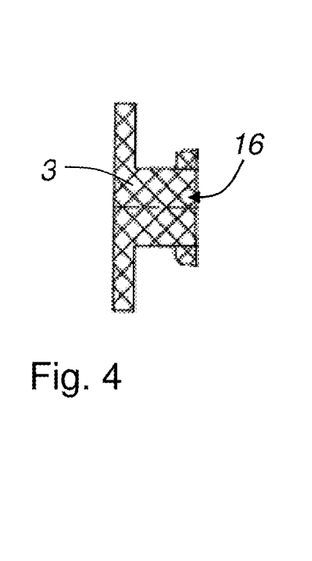
FIG. 4 shows an embodiment of a guiding insert for an embodiment of the guide rail according to the invention.
Figure 5:
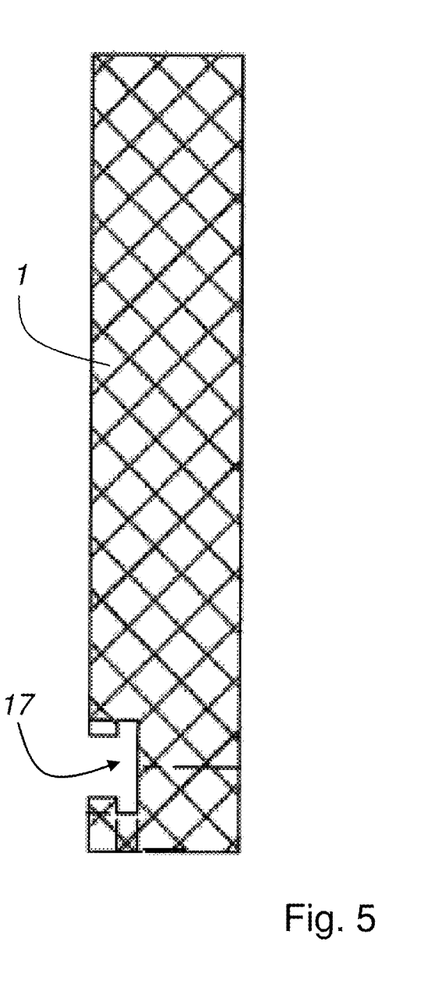
FIG. 5 shows a simplified representation of the guide rail, into which the guiding insert shown in FIG. 4 can be inserted.

FIG. 4 and FIG. 5 show a further embodiment of the guiding insert 3 and of the guide rail 1. The guide rail 1 is shaped as a board (of PE material), in which the negative shape 17 for accommodating the mounting structure 16 of the guiding insert 3 is formed.

Figure 6:
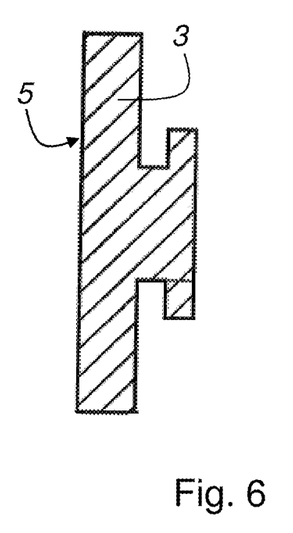
FIG. 6 shows a first embodiment of the guiding insert.

FIG. 6 shows a further embodiment of the guiding insert 3. The entire guiding insert 3 is made of one material, like for example PEEK, PPE, or PEI. Thus this material is also present at the surface 5 of the guiding insert 3, and during transport of the PET-bottles 12 at least one section of the side surface 4 of the PET-bottles 12 touches the surface 5 of the guiding insert 3.

Figure 7:
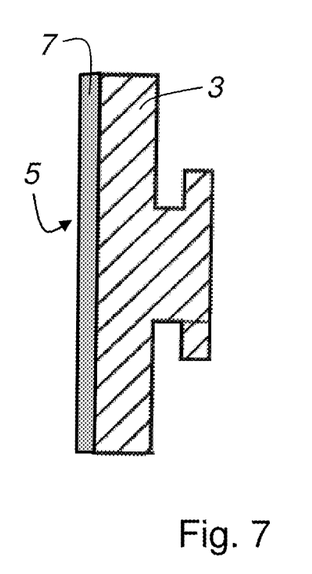
FIG. 7 shows a second embodiment of the guiding insert, wherein the material touching the PET-bottles is provided as a coating.

FIG. 7 shows a further embodiment of the guiding insert 3. The guiding insert 3 exhibits a coating 7 on the surface 5, so that the PET-bottles 12 only touch the coating 7 of the surface 5 of the guiding insert 3. The coating 7 consists of PEEK, PPE, or PEI. These materials are found in the high-priced segment, so that forming a coating 7 on the guiding insert 3 is not a cost-effective solution. The support material or the rest of the guiding insert 3, respectively, may be made form the same and low-priced material as the guide rail 1. Preferentially the material of the guide rail 1 is PE, PE-UHMW, or PE-HD.

The coating 7 may also be applied to the guiding insert 3 by a nanotechnological process, so that the surface 5 exhibits the required property for the transport of the PET-bottles 12.

Figure 8:
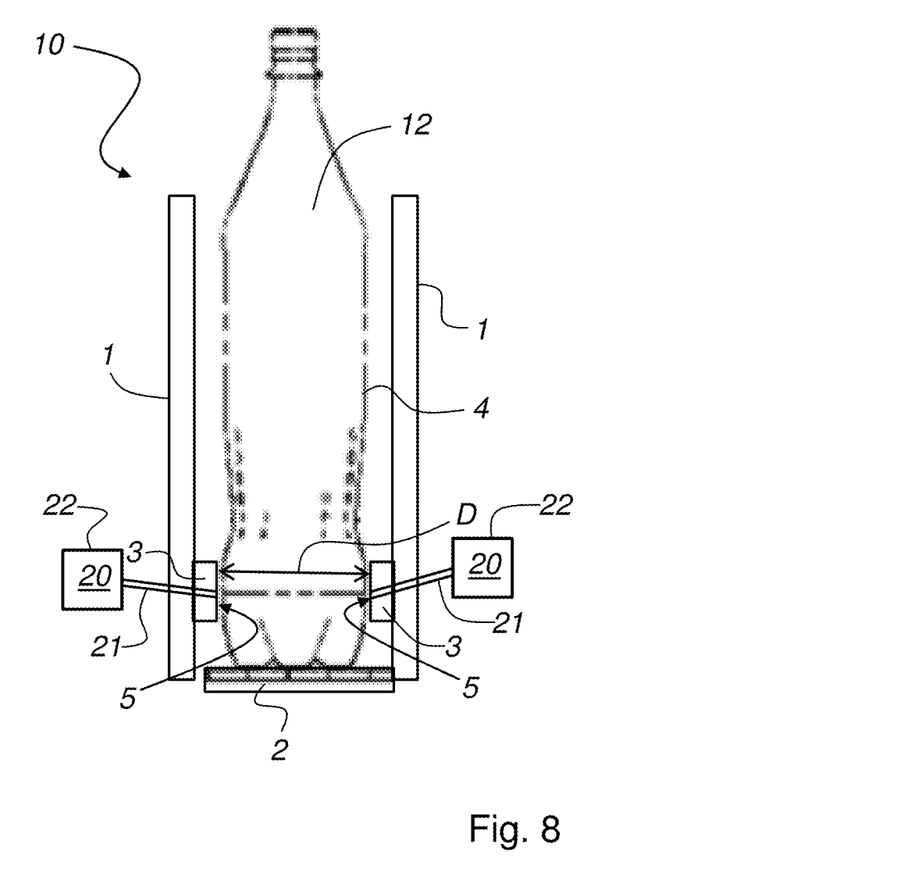
FIG. 8 shows a schematic view of an embodiment of the apparatus for the transport of containers, wherein the guide rail according to the invention can be provided with a lubricant on at least one side which is touching the containers to be transported, in order to reduce friction.

FIG. 8 shows a schematic representation of an embodiment of the apparatus 10 for transporting PET-bottles 12. In the representation shown in FIG. 8 the PET-bottles are transported in a single lane on a conveyor belt 2, usually abutting one another. To this end a guide rail 1 is provided on either side of the conveyor belt 2. In order to further reduce the friction of the PET-bottles 12 with the guide rail 1, a lubricant 20 can be supplied to at least one of the two guide rails 1. In the embodiment shown here the lubricant 20 is supplied to each of the guide rails 1 provided on either side of the conveyor belt 2.

Figure 9:
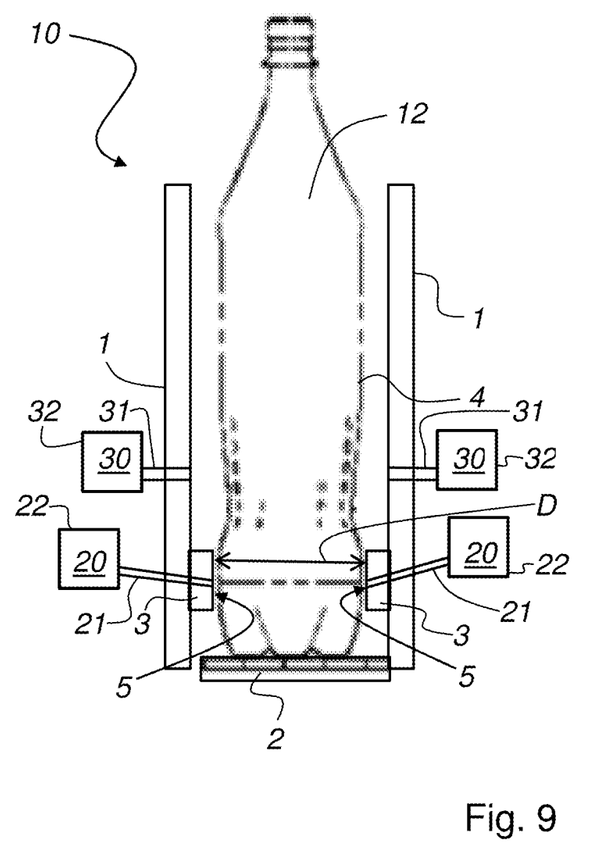
FIG. 9 shows a schematic view of a further embodiment of the apparatus for the transport of containers, wherein the guide rail according to the invention can be provided with a lubricant and water on at least one side which touches the containers to be transported, in order to reduce friction.

Each of the guide rails 1 supports a guiding insert 3 attached to the guide rail 1 in such a way that a surface 5 of the guiding insert 3 facing the PET-bottles 12 touches the PET-bottles 12 during transport. The lubricant 20 is supplied to the surface 5 of the guiding insert 3 facing the PET-bottles 12 by a feed 21, which may be a duct. Through the contact of the PET-bottles 12 with the surface 5 of the guiding insert 3 the lubricant is distributed along the surface 5 of the guiding insert, or carried along with the PET-bottles 12, respectively. The lubricant 20 is taken from a reservoir 22 and is supplied to the surface 5 of the guiding insert 3 in a controlled manner. Even though the representation of FIG. 8 shows reservoirs 22 for the lubricant on either side, this is not to be taken as a limitation of the invention. The number of supply points for the lubricant 20 and the number of required reservoirs essentially is determined by the transport requirements. The minimal requirement is that the lubricant 20 is supplied to at least one surface 5 of the guiding insert 3 of a guide rail 1 at least one position along the guide rail 1. FIG. 9 shows a schematic view of a further embodiment of the apparatus 10 for the transport of PET-bottles 12. The guide rail 1 according to the invention may, on at least one side touching the PET-bottles 12 to be transported, be provided with a lubricant 20 and water 30, in order to reduce the friction between the surface 5 of the guiding insert 3 of the guide rail and the PET-bottles 12. For this purpose, as already described in FIG. 8, the lubricant 20 is supplied from at least one reservoir 22 in a controlled and dosed manner. In addition to the lubricant 20 water 30 may be supplied to the guide rail 1 for further reduction of the friction. The water 30 is also taken from at least one reservoir 32 and supplied to the guide rail 1 by at least one feed 31, which may be a duct. The water 30 is also supplied in such a manner that it eventually reaches the surface 5 of the guiding insert 3. In the embodiment described in FIG. 9 the lubricant 20 supplied and the water 30 mix on the surface 5 of the guiding insert 3. It is also conceivable that only water is supplied in order to wet the surface 5 of the guiding insert 3 and thus reduce the friction between the PET-bottles 12 to be transported and the guide rail 1, or maintain the friction conditions during transport of the PET-bottles 12 within a predefined interval.

Figure 10A:
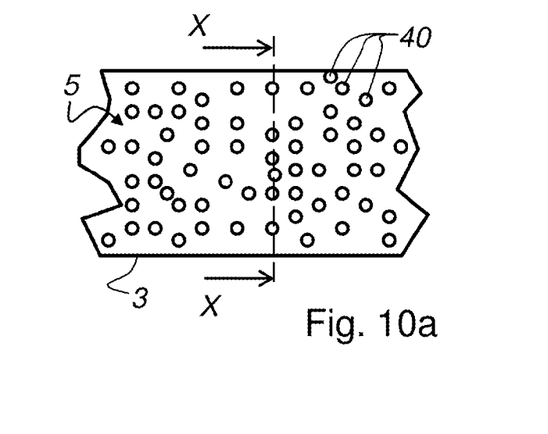
FIG. 10a shows a schematic view of the guide rail according to the invention, the surface of which touches the containers to be transported, exhibits a surface structure, which reduces the coefficient of friction between the guide rail and the container.
Figure 10B:
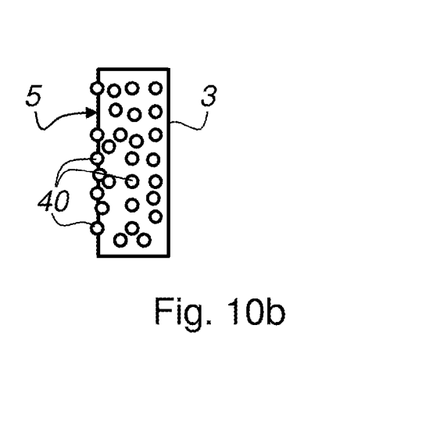

The value or coefficient of friction in the present case describes the friction force, i.e. the value of the friction, between the guide rail 1 or guiding insert 3, respectively, and the PET-bottles 12 (see FIG. 1). FIG. 10a is a schematic view of the guiding insert 3 according to the invention, the surface 5 of which, touching the PET-bottles 12 to be transported, exhibits a surface structure which reduces the coefficient of friction between the guiding insert 3 or guide rail and the PET-bottles 12. The surface structure is formed by a plurality of spherical elements 40 embedded in the basic material and/or support material of the guiding rail or of the guiding insert 3. Some of the spherical elements 40, as shown in FIG. 10*b* (cross section of the guiding insert 3 according to the section line X-X shown in FIG. 10*a*), extend beyond the surface 5 of the guiding insert 3, so that an uneven surface is formed. Thus the friction between the PET-bottles 12 and the surface 5 of the guiding insert 3 is reduced.

Figure 11A:
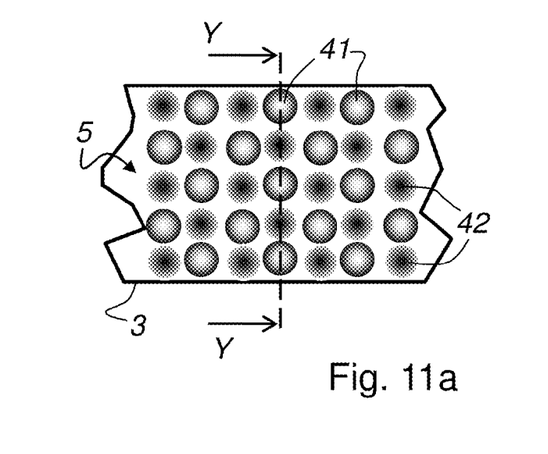
FIG. 11a shows a schematic view of a further embodiment of the guide rail according to the invention, the surface of which is touching the containers to be transported, exhibits a surface structure reducing the coefficient of friction between the guide rail and the container.
Figure 11B:
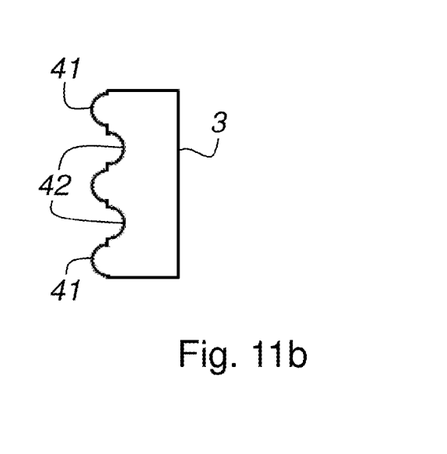

The FIGS. 11*a* and 11*b* show another embodiment based on the same principle that the surface of contact between a guide rail with a treated surface or a guiding insert 5 and the PET-bottles 12 (see FIG. 1) exhibits elevations 41 and/or depressions 42. Even though in FIGS. 11*a* and 11*b* (cross section of the guiding insert 3 according to the section line Y-Y shown in FIG. 11*a*) the elevations 41 and/or depressions 42 have a hemispherical shape, this is not to be taken as a limitation of the invention. The elevations 41 and/or depressions 42 may be grooves, notches, or a further type of profile similar to a grained or wavy contour. The resulting surface of the guiding insert in total exhibits an essentially uniformly cooperating surface of contact in the region of contact of the PET-bottles 12.

The invention has been described with reference to a preferred embodiment. It is conceivable for a person skilled in the art, however, that modifications or alterations of the invention can be made, without leaving the scope of the subsequent claims.

What is claimed is:

1. An apparatus for transporting PET-bottles, comprising:
   a conveyor belt for transporting the PET-bottles in a single lane,
      wherein the PET-bottles are abutting one another most of the time;
   a first guide rail on one side of the conveyor belt and a second guide rail on another side of the conveyor belt;
   guiding inserts, each guiding insert supported by its respective guide rail,
      wherein a surface of each guiding insert facing the PET-bottles is in contact with the PET-bottles during transport;
   a polymer material at least on a surface of each guiding insert in contact with the PET-bottles,
      wherein a modulus of elasticity of the polymer material at 23° C. is larger than a modulus of elasticity of PET and at 100° C. is reduced by less than 20%; and
   means for supplying a lubricant and/or water to the surface of each guiding insert to maintain friction with the PET-bottles and the surface of each guiding insert within a predefined interval.

2. The apparatus of claim 1, wherein the surface of each guiding insert in contact with the PET-bottles is formed by coating with the polymer material.

3. The apparatus of claim 1, wherein each guiding insert is entirely made of the polymer material.

4. The apparatus of claim 1, wherein each guiding insert is attached to its respective guide rail in a form-locking and/or force-locking manner.

5. The apparatus of claim 4, wherein each guide rail is mounted on its respective additional support element.

6. The apparatus of claim 1, wherein each guide rail is made of PE, PE-UHMW, or PE-HD.

7. The apparatus of claim 1, wherein the polymer material or a coating on each guiding insert is PEEK, PPE, or PEI.

8. The apparatus of claim 1, wherein the lubricant is suppliable from at least one reservoir, and/or the water is suppliable from at least one reservoir in a controlled and dosed manner, in such a way that the lubricant and/or the water wet the surface of each guiding insert.

9. The apparatus of claim 8, wherein further comprising a feed for the lubricant and/or a feed for water.

10. An apparatus for transporting containers or PET-bottles, comprising:
    a conveyor belt;
    at least one guide rail defining a transport lane on the conveyor belt;
    a guiding insert supported by said guide rail, such that a surface of the guiding insert facing the PET-bottles is in contact with the PET-bottles during transport;
    a polymer material at least on a surface of the guiding insert in contact with the PET-bottles,
       wherein a modulus of elasticity of the polymer material at 23° C. is larger than a modulus of elasticity of PET and at 100° C. is reduced by less than 20%; and
    means for supplying a lubricant and/or water to the surface of each guiding insert to maintain friction with the PET-bottles and the surface of each guiding insert within a predefined interval.

11. The apparatus of claim 10, wherein the surface of the guiding insert in contact with the PET-bottles is formed by coating with the polymer material.

12. The apparatus of claim 10, wherein the guiding insert is entirely made of the polymer material.

13. The apparatus of claim 10, wherein the lubricant is suppliable from at least one reservoir, and/or the water is suppliable from at least one reservoir in a controlled and dosed manner, in such a way that the lubricant and/or the water wet the surface of the guiding insert.

14. An apparatus for transporting PET-bottles, comprising:
    a conveyor belt for transporting the PET-bottles in a single lane,
       wherein the PET-bottles are abutting one another most of the time;
    a first guide rail on one side of the conveyor belt and a second guide rail on another side of the conveyor belt;
    guiding inserts, each guiding insert supported by its respective guide rail,
       wherein a surface of each guiding insert facing the PET-bottles is in contact with the PET-bottles during transport;
    a polymer material at least on a surface of each guiding insert in contact with the PET-bottles,
       wherein a modulus of elasticity of the polymer material at 23° C. is larger than a modulus of elasticity of PET and at 100° C. is reduced by less than 20%; and
    a filler material is provided with the polymer material to increase the mechanical stability the polymer material.

15. The apparatus of claim 14, wherein the filler material consists of glass fibres, or spheres of glass, or spheres of ceramic.

16. The apparatus of claim 14, wherein each guiding insert is attached to its respective guide rail in a form-locking and/or force-locking manner.

17. The apparatus of claim 16, wherein each guide rail is mounted on its respective additional support element.

18. The apparatus of claim 14, wherein each guide rail is made of PE, PE-UHMW, or PE-HD.

19. The apparatus of claim 14, wherein the polymer material or a coating on each guiding insert is PEEK, PPE, or PEI.

20. The apparatus of claim 14, further comprising means for supplying a lubricant and/or water to the surface of each guiding insert to maintain friction with the PET-bottles and the surface of each guiding insert within a predefined interval.

21. The apparatus of claim 20, wherein the lubricant is suppliable from at least one reservoir, and/or the water is suppliable from at least one reservoir in a controlled and dosed manner, in such a way that the lubricant and/or the water wet the surface of each guiding insert.

22. The apparatus of claim 21, further comprising a feed for the lubricant and/or a feed for water.

23. An apparatus for transporting PET-bottles, comprising:
a conveyor belt for transporting the PET-bottles in a single lane,
wherein the PET-bottles are abutting one another most of the time;
a first guide rail on one side of the conveyor belt and a second guide rail on another side of the conveyor belt;
guiding inserts, each guiding insert supported by its respective guide rail,
wherein a surface of each guiding insert facing the PET-bottles comprises elevations and/or depressions shaped as grooves, notches, grained contours, or wave contours,
wherein the surface of each guiding insert facing the PET-bottles is in contact with the PET-bottles during transport, and
wherein each guiding insert is in contact with the PET-bottles in a region of a maximum effective diameter of the PET-bottles; and
a polymer material at least on a surface of each guiding insert in contact with the PET-bottles,
wherein a modulus of elasticity of the polymer material at 23° C. is larger than a modulus of elasticity of PET and at 100° C. is reduced by less than 20%.

24. The apparatus of claim 23 wherein the polymer material of the guiding insert or of the coating on the guiding insert is PEEK, PPE, or PEI.

25. The apparatus of claim 23, further comprising means for supplying a lubricant and/or water to the surface of each guiding insert to maintain friction with the PET-bottles and the surface of each guiding insert within a predefined interval.

26. The apparatus of claim 23, wherein a lubricant is suppliable from at least one reservoir, and/or water is suppliable from at least one reservoir in a controlled and dosed manner, in such a way that the lubricant and/or the water wet the surface of each guiding insert.

27. The apparatus of claim 24, further comprising a feed for the lubricant and/or a feed for water.

* * * * *